US010151641B2

(12) United States Patent
Herman et al.

(10) Patent No.: US 10,151,641 B2
(45) Date of Patent: Dec. 11, 2018

(54) TOTAL AIR TEMPERATURE PROBES FOR REDUCING DEICING HEATER ERROR

(71) Applicant: Rosemount Aerospace Inc., Burnsville, MN (US)

(72) Inventors: Chad James Herman, Chanhassen, MN (US); Howard Earl Larson, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/496,449

(22) Filed: Apr. 25, 2017

(65) Prior Publication Data

US 2017/0227404 A1  Aug. 10, 2017

Related U.S. Application Data

(62) Division of application No. 13/964,693, filed on Aug. 12, 2013, now Pat. No. 9,658,117.

(60) Provisional application No. 61/684,714, filed on Aug. 18, 2012.

(51) Int. Cl.
*G01K 13/02* (2006.01)
*G01K 1/20* (2006.01)

(52) U.S. Cl.
CPC ............. *G01K 1/20* (2013.01); *G01K 13/028* (2013.01); *G01K 2013/024* (2013.01)

(58) Field of Classification Search
CPC combination set(s) only.
See application file for complete search history.

(56) References Cited

U.S. PATENT DOCUMENTS

| 2,970,475 | A | 2/1961 | Werner |
| 7,031,871 | B2 * | 4/2006 | Severson ............... G01K 13/02 374/E13.006 |
| 7,150,560 | B2 | 12/2006 | Hanson et al. |
| 7,357,572 | B2 | 4/2008 | Benning et al. |
| 7,828,477 | B2 | 11/2010 | Benning et al. |
| 8,104,955 | B2 | 1/2012 | Benning et al. |
| 2003/0058919 | A1 | 3/2003 | Ice et al. |
| 2005/0066722 | A1 | 3/2005 | Magnin |
| 2008/0285620 | A1 * | 11/2008 | Benning ............... G01K 13/02 374/138 |
| 2011/0013664 | A1 | 1/2011 | Benning et al. |

OTHER PUBLICATIONS

Extended European Search Report issued in corresponding European Patent Application No. EP 13180447.8, dated Aug. 26, 2016.

* cited by examiner

*Primary Examiner* — Lisa Caputo
*Assistant Examiner* — Nasir U Ahmed
(74) *Attorney, Agent, or Firm* — Locke Lord LLP; Scott D. Wofsy; Joshua L. Jones

(57) ABSTRACT

A total air temperature probe includes a probe head having an airflow inlet, a main airflow outlet, a main probe head wall extending from the airflow inlet to the main airflow outlet, and a flow separation bend wall positioned between the airflow inlet and the main airflow outlet. The flow separation bend wall is opposite the main probe head wall across a primary flow passage defined through the probe head from the airflow inlet to the main airflow outlet. A flow separation trip feature is defined on an interior surface of the main probe head wall for tripping a boundary layer flow separation in flow in the primary flow passage, e.g., for reduction of deicing heater error.

12 Claims, 3 Drawing Sheets

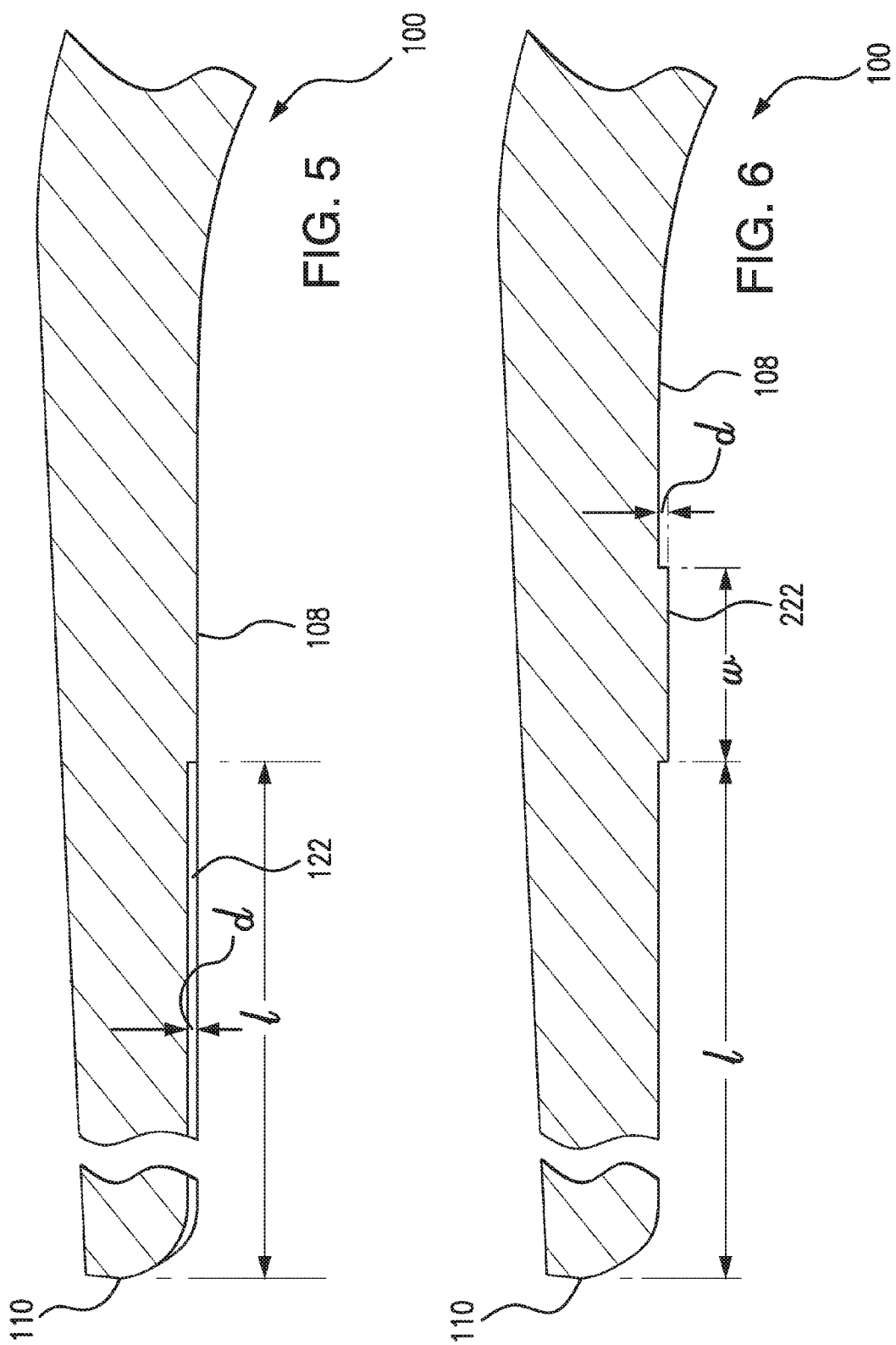

TOTAL AIR TEMPERATURE PROBES FOR REDUCING DEICING HEATER ERROR

CROSS-REFERENCE TO RELATED APPLICATIONS

This application is a divisional of U.S. patent application Ser. No. 13/964,693 filed Aug. 12, 2013, which claims priority to U.S. Provisional Patent Application No. 61/684,714 filed Aug. 18, 2012, each of which is incorporated by reference herein in its entirety.

BACKGROUND OF THE INVENTION

1. Field of the Invention

The present disclosure relates to total air temperature (TAT) probes or sensors. More particularly, the present disclosure relates to heated TAT probes.

2. Description of Related Art

Modem jet powered aircraft require very accurate measurement of outside air temperature (OAT) for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or ($T_S$), (2) total air temperature (TAT) or ($T_t$), (3) recovery temperature ($T_r$), and (4) measured temperature ($T_m$). Static air temperature (SAT) or ($T_S$) is the temperature of the undisturbed air through which the aircraft is about to fly. Total air temperature (TAT) or ($T_t$) is the maximum air temperature that can be attained by 100% conversion of the kinetic energy of the flight. The measurement of TAT is derived from the recovery temperature ($T_r$), which is the adiabatic value of local air temperature on each portion of the aircraft surface due to incomplete recovery of the kinetic energy. Recovery temperature ($T_r$) is obtained from the measured temperature ($T_m$), which is the actual temperature as measured, and which differs from recovery temperature because of heat transfer effects due to imposed environments.

Conventional TAT probes, although often remarkably efficient as TAT sensors, sometimes face the difficulty of working in icing conditions. During flight in icing conditions, water droplets, and/or ice crystals, are ingested into the TAT probe where, under moderate to severe conditions, they can accrete around the opening of the internal sensing element. An ice ridge can grow and eventually break free—clogging the sensor temporarily and causing an error in the TAT reading. To address this problem, conventional TAT probes have incorporated an elbow, or bend, to inertially separate these particles from the airflow before they reach the sensing element.

Another phenomenon which presents difficulties to some conventional TAT probe designs has to do with the problem of boundary layer separation, or "spillage," at low mass flows. Flow separation creates two problems for the accurate measurement of TAT. The first has to do with turbulence and the creation of irrecoverable losses that reduce the measured value of TAT. The second is tied to the necessity of having to heat the probe in order to prevent ice formation during icing conditions. Anti-icing performance is facilitated by heater elements embedded in the housing walls. Unfortunately, external heating also heats the internal boundary layers of air which, if not properly controlled, provides an extraneous heat source in the measurement of TAT. This type of error, commonly referred to as deicing heater error (DHE), is difficult to correct for. Commonly, in TAT probes, the inertial flow separation bend described above has vent or bleed holes distributed along its inner surface. The holes are vented, through a bleed port air exit, to a pressure equal to roughly that of the static atmospheric pressure outside of the TAT probe. In this manner, a favorable pressure difference is created which removes a portion of the boundary layer through the bleed holes, and pins the remaining boundary layer against the elbow's inner wall.

In certain situations, the differential pressure across the bleed holes can drop to zero due to the higher flow velocity along the elbow's inner radius. This stagnation of flow through the bleed holes creates a loss in boundary layer control. The resulting perturbation, if large enough, can cause the boundary layer to separate from the inner surface and make contact with the sensing element. Because the housing walls are heated, so is the boundary layer. Hence, any contamination of the main airflow by the heated boundary layer will result in a corresponding error in the TAT measurement. In general, it is difficult to prevent the stagnation of some of the bleed holes. Thus, DHE is difficult to prevent or reduce.

Some solutions for these challenges have been described in U.S. Pat. No. 7,357,572, U.S. Pat. No. 8,104,955, and U.S. Pat. No. 7,828,477, each of which is incorporated by reference herein in its entirety. Such conventional methods and systems have generally been considered satisfactory for their intended purpose. However, there is an ever present need in the art for improved DHE performance. There also remains a need in the art for such a systems and methods that are easy to make and use. The present disclosure provides a solution for these problems.

SUMMARY OF THE INVENTION

A total air temperature probe includes a probe head having an airflow inlet, a main airflow outlet, a main probe head wall extending from the airflow inlet to the main airflow outlet, and a flow separation bend wall positioned between the airflow inlet and the main airflow outlet. The flow separation bend wall is opposite the main probe head wall across a primary flow passage defined through the probe head from the airflow inlet to the main airflow outlet. A flow separation trip feature is defined on an interior surface of the main probe head wall for tripping a boundary layer flow separation in flow in the primary flow passage.

In certain embodiments, a strut connects between the probe head and an opposed probe mount. The strut defines a sensor passage connected to the primary flow passage and oriented at an angle relative to a flow axis defined from the airflow inlet to the main airflow outlet. A temperature sensor is mounted within the sensor passage for total air temperature measurements. A deicing heater is operatively connected to heat the probe head and to form a heated boundary layer within the primary flow passage with a portion of the heated boundary layer passing from the primary flow passage into the sensor passage. The sensor and the flow separation trip feature are positioned so the portion of the heated boundary layer passing into the sensor passage substantially avoids the sensor for reduction of deicing heater error. It is also contemplated that a thermal shield can be included in the sensor passage between the sensor and the sensor passage interior wall, wherein the flow separation trip feature and thermal shield are positioned so the portion of the heated boundary layer passing into the sensor passage substantially avoids spilling into the thermal shield.

It is contemplated that in certain embodiments, the flow separation trip feature includes a notch set in from the interior surface of the main probe head wall. The notch can span the main probe head wall from one of a pair of the opposed sidewalls to the other, wherein each sidewall connects between the main probe head wall and the flow separation bend wall. The notch can have a leading notch edge spaced inward from the airflow inlet by 0.8 inches (2.032 cm), and can have a depth relative to the interior surface of the main probe head wall of 0.008 inches (0.0203 cm).

It is also contemplated that in certain embodiments, the flow separation trip feature includes a protrusion set out from the interior surface of the main probe head wall. The protrusion can span the main probe head wall from one of the opposed sidewalls to the other as described above. The protrusion can have a leading edge spaced inward from the airflow inlet by 0.8 inches (2.032 cm), and can protrude from the interior surface of the main probe head wall by 0.008 inches (0.0203 cm).

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 5 is a cross-sectional side elevation view of a portion of the total air temperature probe of FIG. 1, showing the separation trip feature as a notch set into the inner surface of the main probe head wall; and FIG. 6 is a cross-sectional side elevation view of a portion of the total air temperature probe of FIG. 1, showing another exemplary embodiment of the separation trip feature as a protrusion protruding from the inner surface of the main probe head wall.

DETAILED DESCRIPTION OF THE PREFERRED EMBODIMENTS

Figure 1:
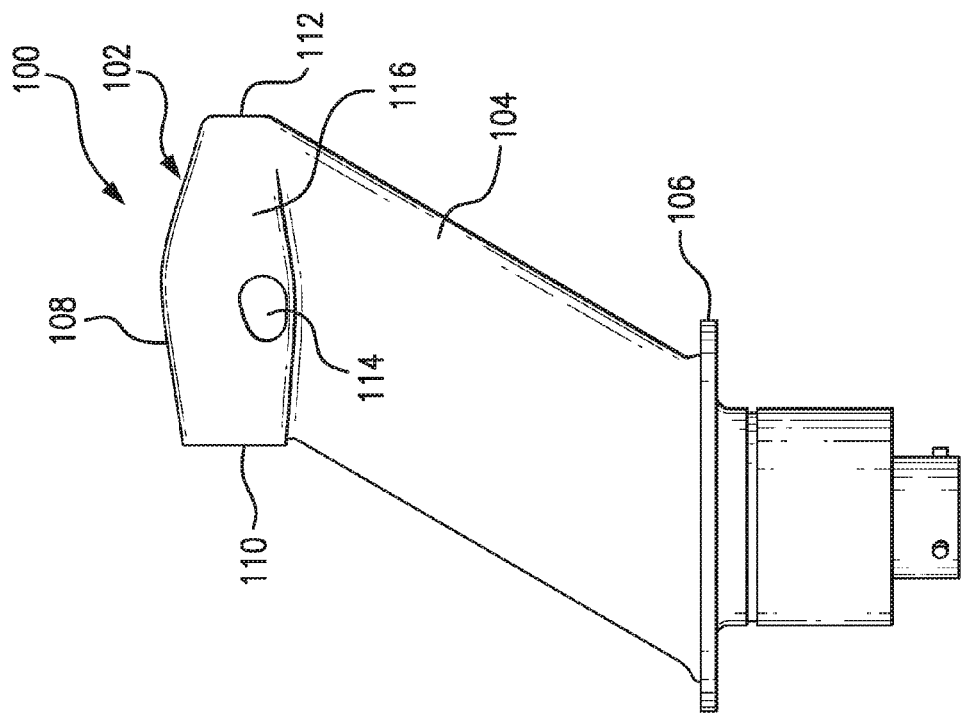
FIG. 1 is a perspective view of an exemplary embodiment of a total air temperature probe constructed in accordance with the present disclosure, showing the probe head, strut, and probe mount.
Figure 2:
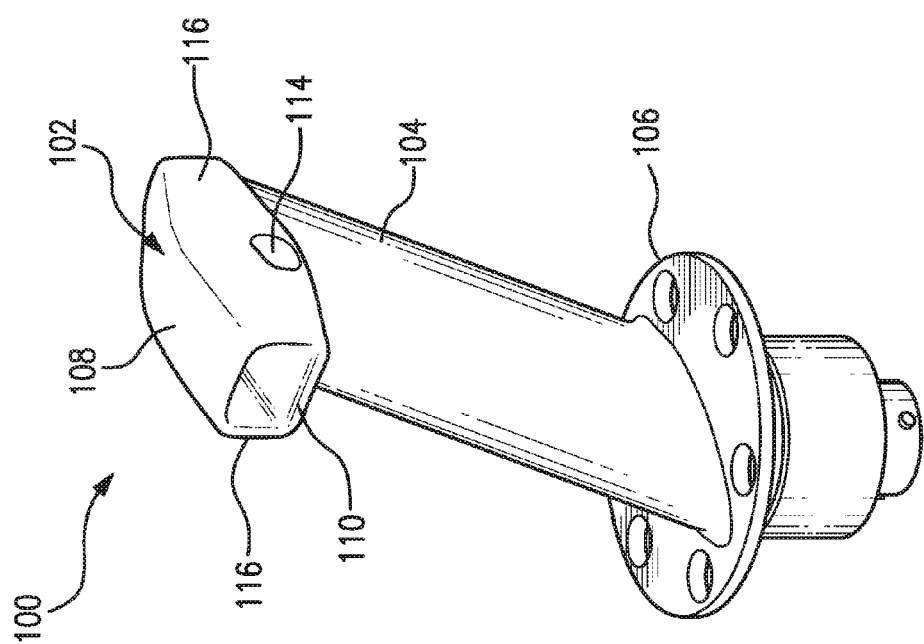
FIG. 2 is a side elevation view of the total air temperature probe of FIG. 1, showing the airflow inlet and main airflow outlet of the primary flow passage through the probe head.

Reference will now be made to the drawings wherein like reference numerals identify similar structural features or aspects of the subject disclosure. For purposes of explanation and illustration, and not limitation, a partial view of an exemplary embodiment of a total air temperature probe in accordance with the disclosure is shown in FIG. 1 and is designated generally by reference character 100. Other embodiments of total air temperature probes in accordance with the disclosure, or aspects thereof, are provided in FIGS. 2-6, as will be described. The systems and methods described herein can be used to reduce or eliminate deicing heater error (DHE) in total air temperature (TAT) probes.

Total air temperature probe 100 includes a probe head 102 having an airflow inlet 110, a main airflow outlet 112 (shown in FIG. 2), and a strut 104 connecting between probe head 102 and an opposed probe mount 106. A main probe head wall 108 extends from inlet 110 to outlet 112. Cross-ports 114 are defined in each respective sidewall 116 of probe head 102.

Figure 3:
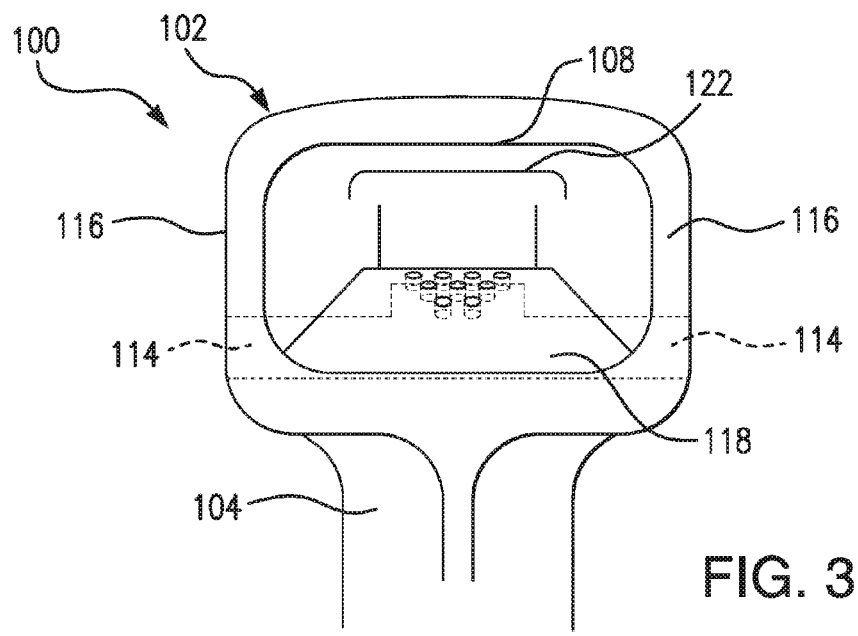
FIG. 3 is an inlet end elevation view of a portion of the total air temperature probe of FIG. 1, showing the flow separation trip feature spanning from sidewall to sidewall in the probe head.
Figure 4:
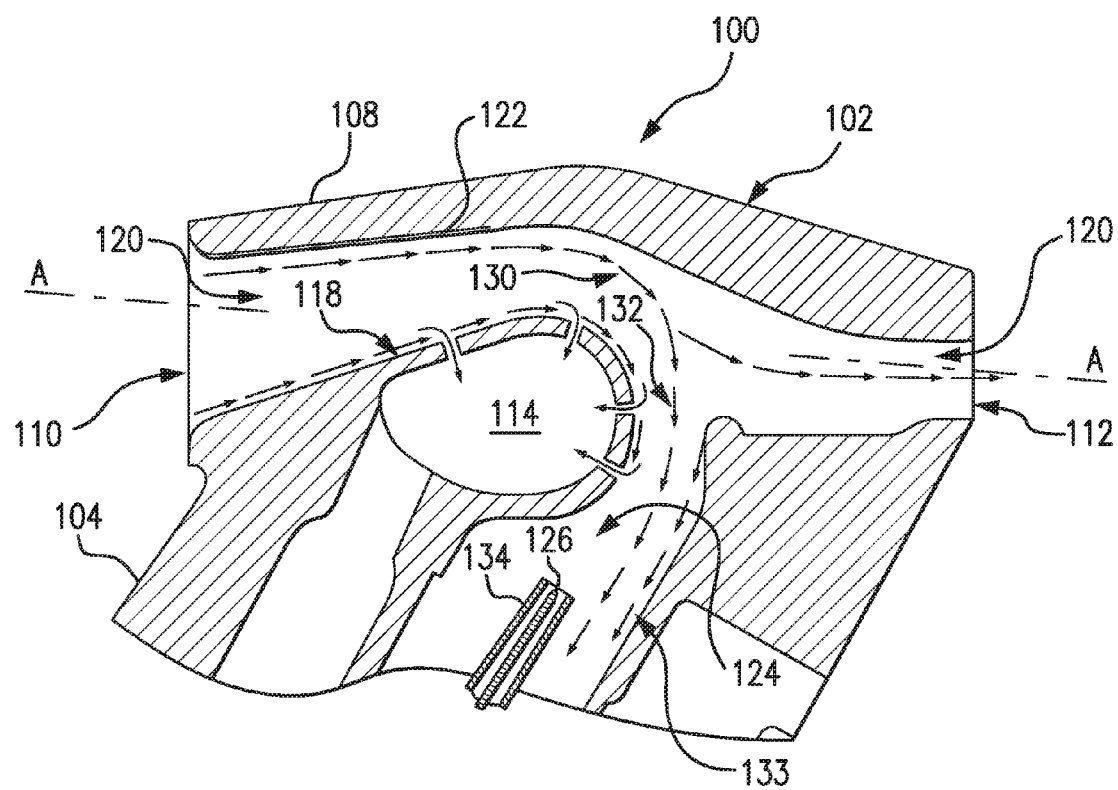
FIG. 4 is a cross-sectional side elevation view of a portion of the total air temperature probe of FIG. 1, schematically showing how the heated boundary layer avoids contacting the sensor.

Referring now to FIGS. 3 and 4, a flow separation bend wall 118 is positioned between inlet 110 and outlet 112. Flow separation bend wall 118 is opposite main probe head wall 108 across a primary flow passage 120 that is defined through probe head 102 from inlet 110 to main airflow outlet 112. Each sidewall 116 connects between main probe head wall 108 and flow separation bend wall 118.

A flow separation trip feature 122 is defined on an interior surface of the main probe head wall 108 for tripping a boundary layer flow separation in flow in primary flow passage 120. In each of FIGS. 3 and 4, trip feature 122 is shown schematically.

Strut 104 defines a sensor passage 124 that is fluidly connected to primary flow passage 120. Sensor passage 124 is oriented at an oblique angle relative to a flow axis A defined from inlet 110 to main airflow outlet 112, however those skilled in the art will readily appreciate that a 90° angle can also be used as suitable for given applications.

A temperature sensor 126 is mounted within sensor passage 124 for total air temperature measurements. A deicing heater is imbedded in main probe head wall 108, flow separation bend wall 118, and sidewalls 116 positioned between inlet 110 and outlet 112, as well as in strut 104, and is operatively connected to heat probe head 102 and strut 104 and to form a heated boundary layer 130 within the primary flow passage with a portion 132 of the heated boundary layer passing from primary flow passage 120 into the sensor passage 124. Boundary layer 130 is indicated schematically by arrows in FIG. 4. Sensor 126 and trip feature 122 are positioned so portion 132 of the heated boundary layer 130 passing into sensor passage 124 substantially avoids sensor 126 for reduction of deicing heater error. Sensor 126 and trip feature 122 are also positioned so a heated boundary layer 133 from the aft wall of passage 124 substantially avoids sensor 126. A thermal shield 134 is included in sensor passage 124 between sensor 126 and the sensor passage interior wall. Trip feature 122 and thermal shield 134 are positioned so the portion 132 of the heated boundary layer 130 as well as boundary layer 133 passing into sensor passage 124 substantially avoid spilling into thermal shield 134. Since little or no portion of heated boundary layers 130 and 133 enters thermal shield 134 or contacts sensor 126, deicing heater error (DHE) is reduced or eliminated.

Flow separation trip feature 122 is a notch set in from the interior surface of main probe head wall 108. As indicated schematically in FIG. 3, the notch spans main probe head wall 108 from one sidewall 116 to the other. Referring to FIG. 5, the notch can have a leading notch edge spaced inward from inlet 110 by a length l of 0.8 inches (2.032 cm), and can have a depth d relative to the interior surface of main probe head wall 108 of 0.008 inches (0.0203 cm). Referring to FIG. 6, it is also contemplated that the flow separation trip feature can instead be a protrusion 222 set out from the interior surface of main probe head wall 108. Protrusion 222 can span main probe head wall 108 from one sidewall 116 to the other as described above. Protrusion 222 can be formed integral with probe head 102, or can be formed separately and joined or adhered to the inner surface of main probe head wall 108. Protrusion 222 can have a leading edge spaced inward from inlet 110 by a length l of 0.8 inches (2.032 cm), and can protrude from the interior surface of main probe head wall 108 by a thickness d of 0.008 inches (0.0203 cm). Protrusion 222 also has a width w of 0.125 inches (0.318 cm).

Potential advantages of probes in accordance with the present disclosure include more uniform and consistent airflow over the sensing elements, for example at conditions with low Zeta values where Zeta is defined as corrected Mach number for a particular altitude (e.g., at high Mach numbers and at high altitudes, such as over 40,000 ft (12,192 m) and over Mach 0.77). This means a given TAT probe will have more consistent readings, as well as readings being more consistent from one TAT probe to another. Another potential advantage is reduced sensitivity to boundary layer separation. Reduction of deicing heater error (DHE), e.g., at high altitudes, can advantageously reduce the number of total air temperature (TAT) probe miscompares in systems with multiple TAT probes, without negatively effecting TAT probe performance at lower altitudes, e.g., at or near sea level.

The methods and systems of the present disclosure, as described above and shown in the drawings, provide for total air temperature (TAT) probes with superior properties including reduced or eliminated deicing heater error (DHE). While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A total air temperature probe comprising:
    a probe head having an airflow inlet, a main airflow outlet, a main probe head wall extending from the airflow inlet to the main airflow outlet, and a flow separation bend wall positioned between the airflow inlet and the main airflow outlet, the flow separation bend wall being opposite the main probe head wall across a primary flow passage defined through the probe head from the airflow inlet to the main airflow outlet;
    opposed sidewalls, each sidewall connecting between the main probe head wall and the flow separation bend wall;
    a flow separation trip feature defined on an interior surface of the main probe head wall for tripping a boundary layer flow separation in flow in the primary flow passage, wherein the flow separation trip feature spans the main probe head wall from one of the opposed sidewalls to the other;
    a strut connecting between the probe head and an opposed probe mount, the strut defining a sensor passage connected to the primary flow passage and oriented at an angle relative to a flow axis defined from the airflow inlet to the main airflow outlet, wherein a temperature sensor is mounted within the sensor passage for total air temperature measurements;
    a thermal shield is included in the sensor passage between the sensor and an interior wall of the sensor passage; and
    a deicing heater operatively connected to heat the probe head and strut to form a heated boundary layer within the primary flow passage with a portion of the heated boundary layer passing from the primary flow passage into the sensor passage, wherein the flow separation trip feature is positioned so the portion of the heated boundary layer passing into the sensor passage avoids spilling into the thermal shield for reduction of deicing heater error.

2. A total air temperature probe as recited in claim 1, wherein the flow separation trip feature includes a notch set in from the interior surface of the main probe head wall.

3. A total air temperature probe as recited in claim 2, wherein the notch has a leading notch edge spaced inward from the airflow inlet by 0.8 inches (2.032 cm).

4. A total air temperature probe as recited in claim 2, wherein the notch has a depth relative to the interior surface of the main probe head wall of 0.008 inches (0.0203 cm).

5. A total air temperature probe as recited in claim 1, wherein the flow separation trip feature includes a protrusion set out from the interior surface of the main probe head wall.

6. A total air temperature probe as recited in claim 5, wherein the protrusion has a leading edge spaced inward from the airflow inlet by 0.8 inches (2.032 cm).

7. A total air temperature probe as recited in claim 5, wherein the protrusion protrudes from the interior surface of the main probe head wall by 0.008 inches (0.0203 cm).

8. A total air temperature probe comprising:
    a probe head having an airflow inlet, a main airflow outlet, a main probe head wall extending from the airflow inlet to the main airflow outlet, and a flow separation bend wall positioned between the airflow inlet and the main airflow outlet, the flow separation bend wall being opposite the main probe head wall across a primary flow passage defined through the probe head from the airflow inlet to the main airflow outlet;
    opposed sidewalls, each sidewall connecting between the main probe head wall and the flow separation bend wall;
    a flow separation trip feature defined on an interior surface of the main probe head wall for tripping a boundary layer flow separation in flow in the primary flow passage, wherein the flow separation trip feature spans the main probe head wall from one of the opposed sidewalls to the other, and wherein the flow separation trip feature has a leading edge spaced inward from the airflow inlet;
    a strut connecting between the probe head and an opposed probe mount, the strut defining a sensor passage connected to the primary flow passage and oriented at an angle relative to a flow axis defined from the airflow inlet to the main airflow outlet, wherein a temperature sensor is mounted within the sensor passage for total air temperature measurements;
    a thermal shield is included in the sensor passage between the sensor and an interior wall of the sensor passage; and
    a deicing heater operatively connected to heat the probe head and strut to form a heated boundary layer within the primary flow passage with a portion of the heated boundary layer passing from the primary flow passage into the sensor passage, wherein the flow separation trip feature is positioned so the portion of the heated boundary layer passing into the sensor passage avoids spilling into the thermal shield for reduction of deicing heater error.

9. A total air temperature probe as recited in claim 8, wherein the flow separation trip feature includes a notch set in from the interior surface of the main probe head wall.

10. A total air temperature probe as recited in claim 9, wherein the notch has a depth relative to the interior surface of the main probe head wall of 0.008 inches (0.0203 cm).

11. A total air temperature probe as recited in claim 8, wherein the flow separation trip feature includes a protrusion set out from the interior surface of the main probe head wall.

12. A total air temperature probe as recited in claim 11, wherein the protrusion protrudes from the interior surface of the main probe head wall by 0.008 inches (0.0203 cm).

\* \* \* \* \*